(12) United States Patent
Lemberg et al.

(10) Patent No.: US 12,137,395 B2
(45) Date of Patent: Nov. 5, 2024

(54) ENHANCED SHORT MESSAGE SERVICE MEMORY MANAGEMENT SUPPORT BY MOBILITY MANAGEMENT COMPONENTS OF DEVICES COMMUNICATING VIA MOBILE WIRELESS NETWORKS

(71) Applicant: United States Cellular Corporation, Chicago, IL (US)

(72) Inventors: Vyacheslav Lemberg, Long Grove, IL (US); Narothum Saxena, Hoffman Estates, IL (US); Michael S. Irizarry, Barrington Hills, IL (US)

(73) Assignee: United States Cellular Corporation, Chicago, IL (US)

( * ) Notice: Subject to any disclaimer, the term of this patent is extended or adjusted under 35 U.S.C. 154(b) by 348 days.

(21) Appl. No.: 17/874,473

(22) Filed: Jul. 27, 2022

(65) Prior Publication Data
US 2024/0040342 A1  Feb. 1, 2024

(51) Int. Cl.
*H04W 4/14* (2009.01)
(52) U.S. Cl.
CPC ..................................... *H04W 4/14* (2013.01)
(58) Field of Classification Search
CPC ....................................................... H04W 4/14
See application file for complete search history.

(56) References Cited

U.S. PATENT DOCUMENTS

2015/0119090 A1* 4/2015 Chuang ................... H04W 4/14
455/466

* cited by examiner

*Primary Examiner* — Curtis B Odom
(74) *Attorney, Agent, or Firm* — Leydig, Voit & Mayer, Ltd.

(57) ABSTRACT

A system and method are described that are carried out by a mobility management component for providing enhanced short message service (SMS) memory handling in the absence of a user equipment (UE) signaling capability to indicate that an SMS memory is available after the UE issues a signal indicating an SMS memory unavailable error condition to the mobility management component. The method includes receiving the signal indicating an SMS memory unavailable error condition from the UE. In accordance with receiving the signal, an SMS memory error condition timer is set for the UE and issues an SMS memory failure message to temporarily cause suspension of sending SMS messages, via a short message service center (SMSC), to the UE. In response to expiration of a time period after the setting the SMS memory error condition timer, the mobility management component issues an SMS memory available message to resume SMS message delivery to the UE.

10 Claims, 9 Drawing Sheets

ENHANCED SHORT MESSAGE SERVICE MEMORY MANAGEMENT SUPPORT BY MOBILITY MANAGEMENT COMPONENTS OF DEVICES COMMUNICATING VIA MOBILE WIRELESS NETWORKS

FIELD OF THE INVENTION

The present disclosure generally relates to mobile wireless communications. More particularly, the present disclosure is directed to enhanced memory management for carrying out short message service (SMS) messaging.

BACKGROUND OF THE INVENTION

Mobile wireless technology has experienced vast improvements in both the ability to handle vast volumes of information at high speeds as well as handling high numbers of simultaneous users by radio access network (RAN) nodes. Additionally the cost of subscribing to mobile wireless network services has reduced relative to the amount of data and service levels (data rates) provided to subscribers. Additionally, the cost of incorporating mobile wireless communications capabilities into a variety of machines/devices has fallen substantially. The result is that mobile wireless services are now economically practical for a variety of Internet of Things (IoT) and Machine-to-Machine (M2M) applications. Examples of such devices include: smart sensors, smart devices, industrial process control sensors and/or actuators, light bulbs, light switches, etc. Such devices are often configured to communicate using short message service (SMS) messaging.

In that regard, M2M and IoT in many instances have a very limited memory capacity for storing SMS messages. For example, an M2M IoT device having mobile wireless communications capability may have a very limited portion of memory reserved for storing SMS messages—as little as 20 or so messages. In the event the buffer is full, rather than pushing oldest messages out (which could be dangerous for operation of a system relying upon the device processing the message before deletion), such devices disable SMS communications until the storage/buffer has sufficient memory available to store new SMS messages. At which point, the device will resume receiving SMS messages.

Currently, certain types of IoT/M2M devices are only capable of signaling to SMS message sources that the device storage is full. Such devices are incapable of issuing a message that memory is now available—e.g. an RP-SM-MEMORY-AVAILABLE (RP-SMMA) message to a mobility management component (e.g. a mobility management entity—MME, an access and mobility management function—AMF) in accordance with 3GPP TS 23.040, 23.272 and 24.011.

SUMMARY OF THE INVENTION

A system and method are disclosed that are carried out by a mobility management component for providing enhanced short message service (SMS) memory handling in the absence of a user equipment signaling capability to indicate that an SMS memory is available after the user equipment issues a signal indicating an SMS memory unavailable error condition to the mobility management component. The method includes receiving the signal indicating an SMS memory unavailable error condition from the user equipment device. In accordance with receiving the signal, the mobility management component sets an SMS memory error condition timer for the user equipment device and issues an SMS memory failure message to temporarily cause suspension of sending SMS messages, via a short message service center (SMSC), to the user equipment device. Thereafter, in response to expiration of a time period after the setting the SMS memory error condition timer, the mobility management component issues an SMS memory available message to resume SMS message delivery to the mobility management component for forwarding to the user equipment device.

BRIEF DESCRIPTION OF THE DRAWINGS

While the appended claims set forth the features of the present invention with particularity, the invention and its advantages are best understood from the following detailed description taken in conjunction with the accompanying drawings, of which:

DETAILED DESCRIPTION OF THE DRAWINGS

In accordance with the present disclosure, an enhanced mobility management component is described that includes additional functionality to accommodate instances of connected devices with limited SMS storage and that are further incapable of signaling when SMS storage is available after initially indicating that SMS storage is full to a sending component.

Figure 1:
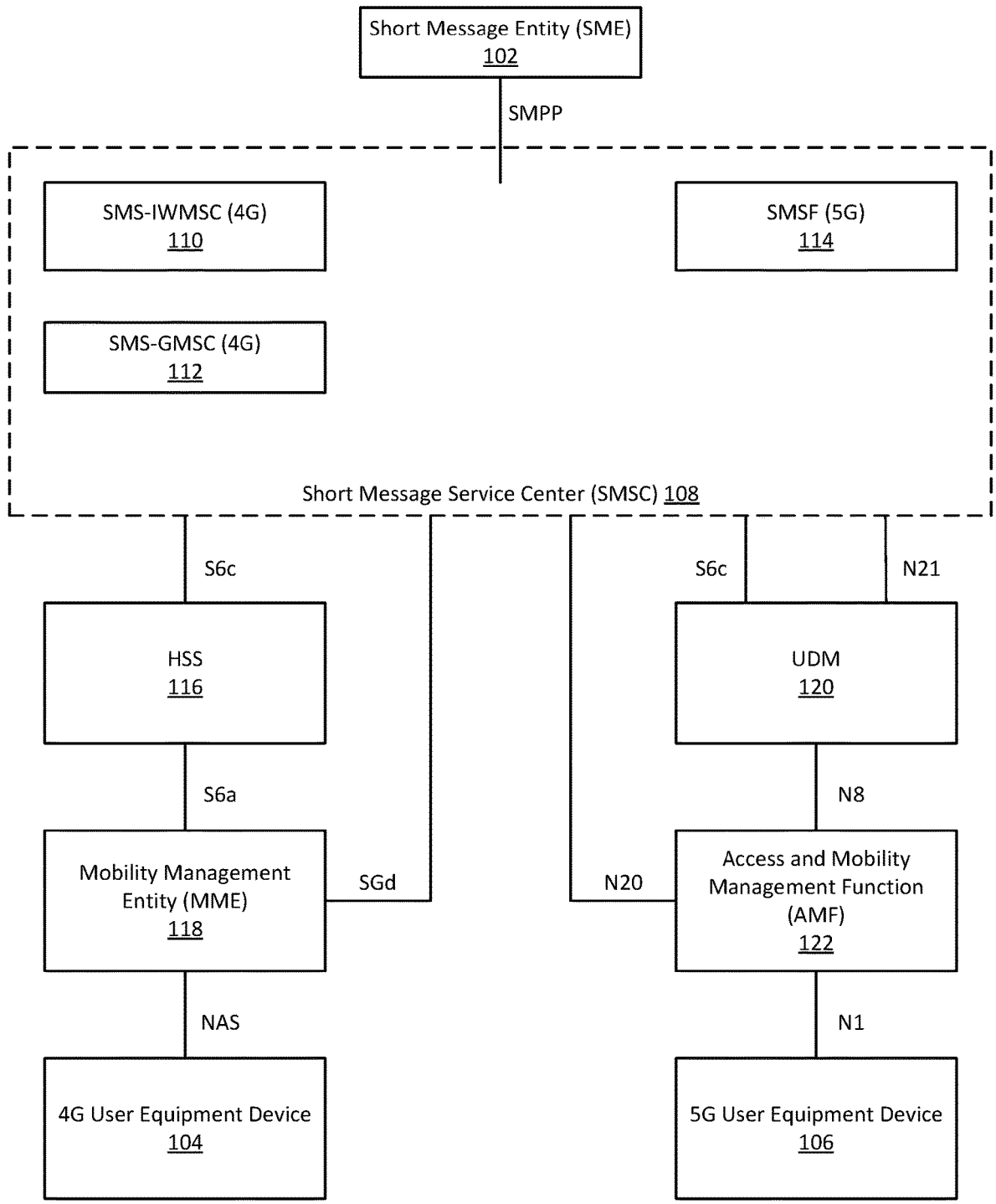
FIG. 1 is a schematic diagram of an exemplary short message service architecture including both 4G and 5G configurations in accordance with the present disclosure.

Before describing illustrative examples of the present disclosure, reference is made to FIG. 1, that summarizes/schematically depicts an exemplary architecture for carrying out SMS over a non-access stratum (NAS)—a functional layer in wireless protocol stacks concerning communications between a core network component and connected devices (e.g. user equipment). The NAS is a layer that carries out managing the initial creation of a session and thereafter carrying out functions for maintaining the session between the user equipment and the core network.

The illustrative example is intended to be implemented in a mobile wireless network implementing various well-known standards. In that regard, the following 3GPP technical specifications are specifically identified and incorporated by reference into the present disclosure:

3GPP TS 23.040, "Technical realization of the Short Message Service (SMS)
3GPP TS 23.272, "Circuit Switched (CS) fallback in Evolved Packet System (EPS); Stage 2"
3GPP TS 23.401, "General Packet Radio Service (GPRS) enhancements for Evolved Universal Terrestrial Radio Access Network (E-UTRAN) access"
3GPP TS 23.501, "System architecture for the 5G System (5GS); Stage 2"
3GPP TS 23.502, "Procedures for the 5G System (5GS); Stage 2"
3GPP TS 24.011, "Point-to-Point (PP) Short Message Service (SMS) support on mobile radio interface"
3GPP TS 24.301, "Non-Access-Stratum (NAS) protocol for Evolved Packet System (EPS); Stage 3"
3GPP TS 29.272, "Evolved Packet System (EPS); Mobility Management Entity (MME) and Serving GPRS Support Node (SGSN) related interfaces based on Diameter protocol"
3GPP TS 29.338, "Diameter based protocols to support Short Message Service (SMS) capable Mobile Management Entities (MMEs)"
3GPP TS 29.503, "5G System; Unified Data Management Services; Stage 3"
3GPP TS 29.518, "5G System; Access and Mobility Management Services; Stage 3"
3GPP TS 29.540, "5G System; SMS Services; Stage 3"

With continued reference to FIG. 1, in the illustrative example a short message entity (SME) 102 operates as a source/receiver of SMS messages to/from connected devices, such as a 4G user equipment device 104 and a 5G user equipment device 106. In that regard, such communications are carried out, for example, by the SME 102 communicating with a short message service center (SMSC) 108 via a short message peer-to-peer (SMPP) standard protocol interface.

As will be appreciated by those skilled in the art, in accordance with an illustrative example, the SMSC 108 includes a set of standard message center service components. The SMSC 108 includes two mobile 4G services switching centers (MSCs) for SMS operations: an SMS Interworking MSC (SMS-IWMSC) 110 and an SMS Gateway MSC (SMS-IWMSC) 112. The SMSC 108 also includes for a 5G implementation, a short message service function (SMSF) 114.

In the case of a 4G implementation, the SMSC 108 communicates with a home subscriber server (HSS) 116 via an S6c interface and a mobility management entity via an SGd interface. The HSS 116 communicates with the MME 118 via an S6a interface. The MME communicates with the 4G user equipment device 104 over an NAS interface.

In the case of a 5G implementation, the SMSC 108 communicates with a unified data management (UDM) component 120 via an S6c interface and an N21 interface and with an access and mobility management function (AMF) 122 via an N20 interface. The UDM component 120 communicates with the AMF 122 via an N8 interface. The AMF 122 communicates with the 5G user equipment device 106 over an N1 interface.

Figure 2:
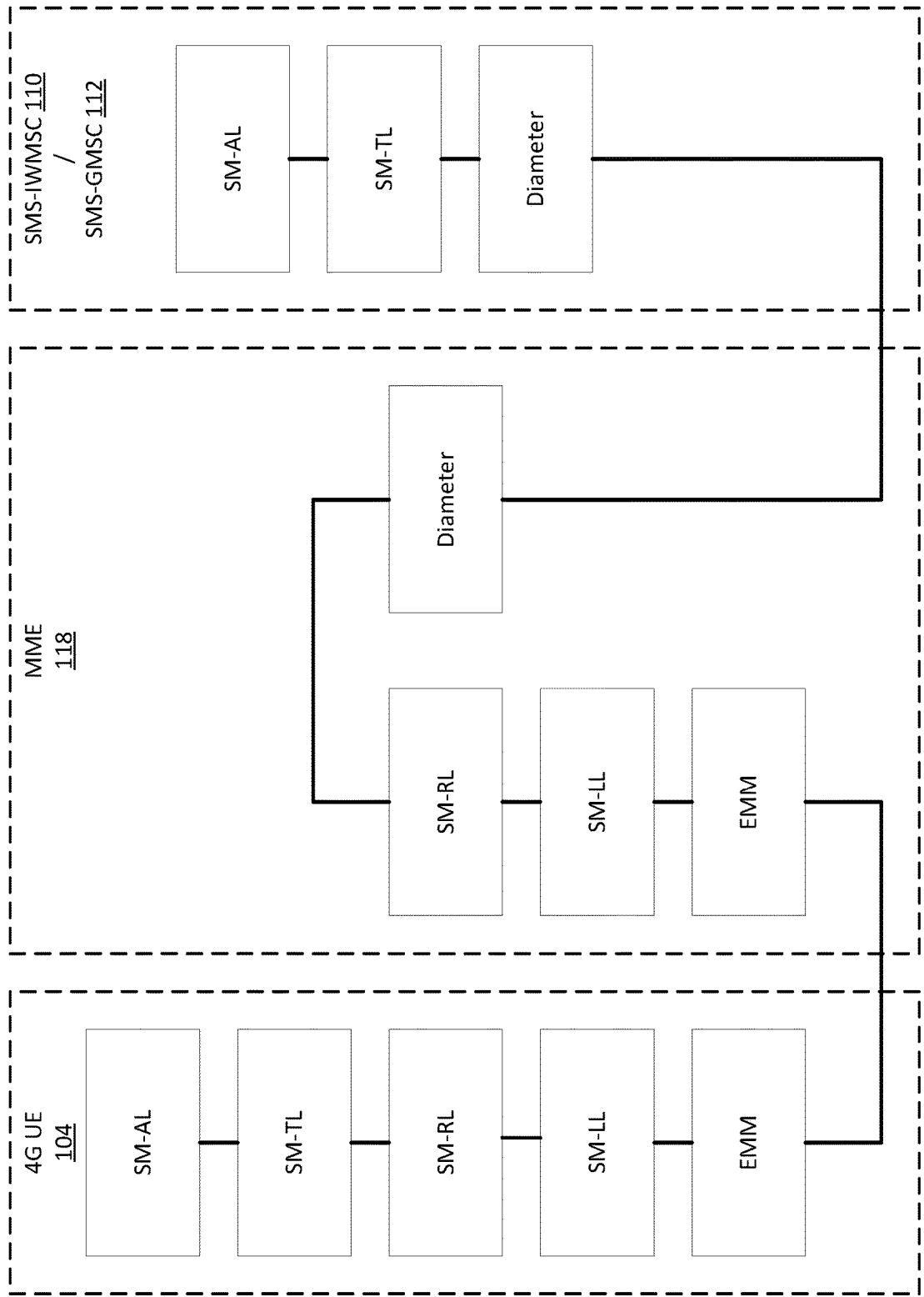
FIG. 2 is a schematic diagram of an exemplary set of messaging components in the user equipment, mobility management entity (MME) and SMS components of a short message service center in accordance with a 4G implementation of the present disclosure.

Turning to FIG. 2, an illustrative example is provided of the protocol layers through which SMS messaging is supported between 4G components of the SMSC 108 and the 4G UE 104 via the MME 118 over NAS. In the illustrative example, the message originates at a short message application layer (SM-AL) and passes sequentially through a short message transport layer (SM-TL), a short message relay layer (SM-RL), a short message lower layer (SM-LL), and an evolved packet system mobility management (EMM) layer. The EMM layer of the 4G UE 104 interfaces with a corresponding EMM layer of the MME 118.

In the MME 118, SMS messages initially pass up to an SM-LL and SM-RL of the MME 118. The SMS messages pass from the SM-RL to a Diameter layer of the MME that, in turn, communicates with a corresponding Diameter handling/interface component of the SMS-IWMSC 110 or SMS-GMSC 112 of the SMSC 108.

At the SMSC 108, the SMS message is passed up/through an SM-TL and an SM-AL.

Figure 3:
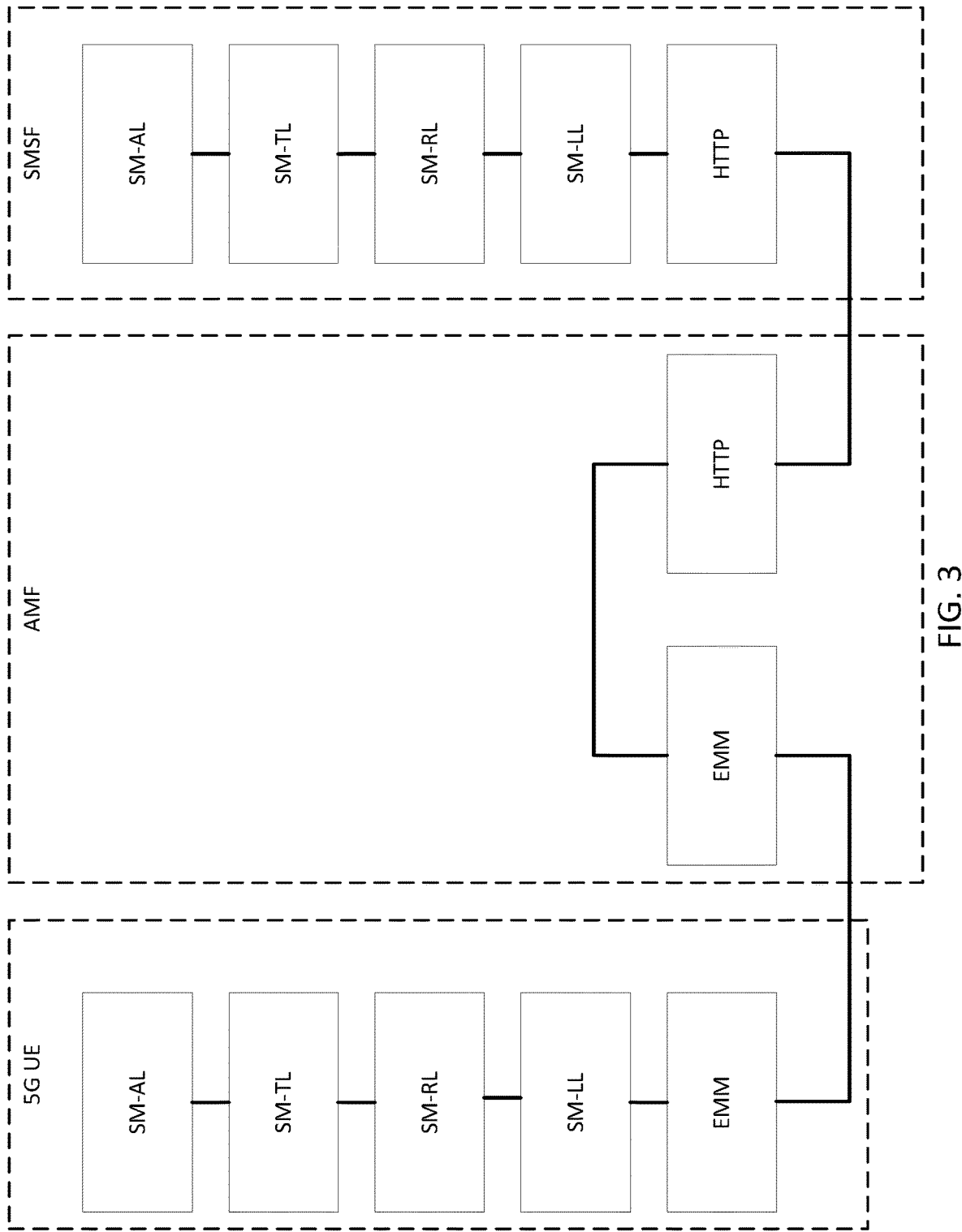
FIG. 3 is a schematic diagram of an exemplary set of messaging components in the user equipment, access and mobility management function (AMF), and a short message service function (SMSF) of a short message service center in accordance with a 5G implementation of the present disclosure.

Turning to FIG. 3, an illustrative example is provided of the protocol layers through which SMS messaging is supported between 5G components of the SMSC 108 and the 5G UE 106 via the AMF 122 over NAS. In the illustrative example, the message originates at an SM-AL and passes sequentially through an SM-TL, an SM-RL, an SM-LL, and an EMM layer. The EMM layer of the 5G UE 106 interfaces with a corresponding EMM layer of the AMF 122.

In the AMF 122, SMS messages pass from the EMM layer component to a hypertext transfer protocol (HTTP) layer component. Thereafter, the SMS message pass from the HTTP layer component to corresponding HTTP layer component of the SMSC 108.

It is noted that the messaging protocols summarized in FIGS. 2 and 3 are exemplary in nature and the current invention is not limited to the illustrative examples.

Having described illustrative 4G and 5G SMS frameworks within which the disclosed enhanced memory management is incorporated, attention will now be directed to details of implementing enhance SMS memory management by mobility management components (e.g., MME 118 and AMF 122) to facilitate notification of SMS message sources when SMS memory is again available in user equipment devices (e.g. 4G device 104 and 5G device 106) after the user equipment issues a notification that memory is not available to receive SMS messages from senders (e.g. SME 102). As will be explained by way of detailed examples herein below, the solution to the above-identified problem involves implementing "memory-available" notification signaling to SMS message sources through enhancements to the mobility management component (e.g., MME 118 and AMF 122) to determine when memory is again available in the SMS memory of the user equipment device and carry out memory available signaling on behalf of the user equipment (e.g. M2M/IoT) devices.

The enhancements include providing a mobile station memory capacity exceeded flag (MCEF) in the mobility management component (e.g. a 4G MME-MCEF timer, a 5G AMF-MCEF timer). When MME/AMF-MCEF timer expires, the MME 118/AMF 122 issues a notification on behalf of the 4G device 104/5G device 106 that the device can now receive SMS messages. More particularly, in the case of the 4G device 104, the MME 118 notifies the HSS 116 that the 4G device 104 can receive SMS messages. In the case of the 5G device 106, the AMF 122 notifies the UDM 120 that the 5G device 106 can receive SMS messages. By way of a specific example, the duration of the MME/AMF-MCEF time is less than 1 minute. More particularly, the expiry interval is about 30 seconds. However, a shorter or longer time can be used in accordance with particular implementations. Preferably, such time is configurable to enable particularized durations for specific types of devices and operating environments to minimize the wait time once SMS memory is likely to be available.

Figure 4:
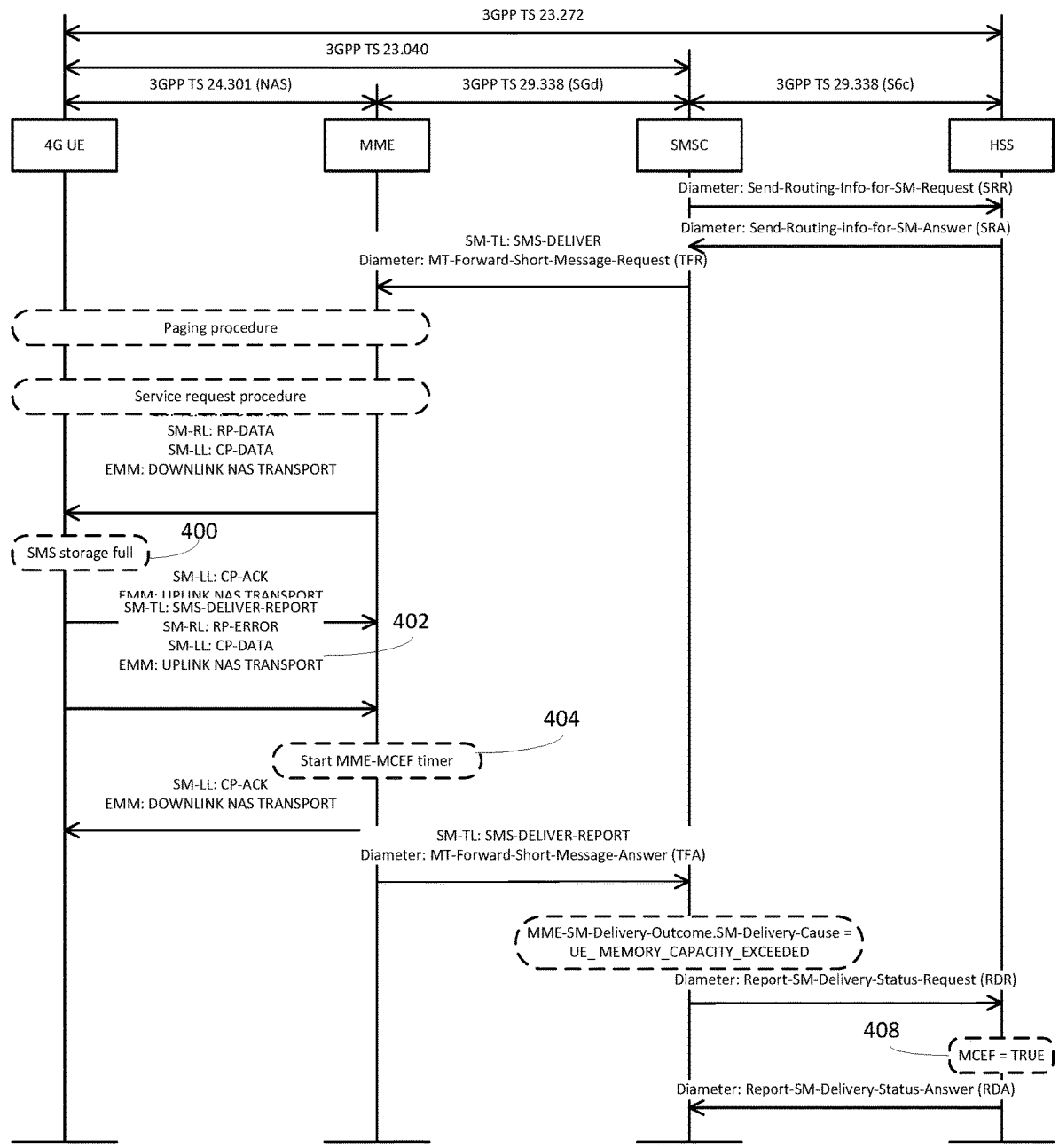
FIG. 4 is a sequence diagram summarizing messages comprising a part of the modifications to the 4G MME in accordance with the current disclosure.

Turning to FIG. 4, an illustrative sequence of messages are shown incorporating the above-described modifications to the 4G MME 118 in accordance with the current disclosure of an enhanced memory management arrangement for 4G devices that are incapable of issuing a notification when SMS memory is again available (after SMS messages could not be received because the SMS memory limit was reached/capacity exceeded). The sequence depicted in FIG. 4 is substantially carrying out the 3GPP TS 23.372 and thus will not be described as such sequence is readily understood by those skilled in the art. However, in accordance with the current disclosure, at 400 the 4G UE device 104 experiences a full storage event. In response, at 402 the 4G UE device 104 issues, via the NAS transport layer signaling, an error message to the MME 118 indicating that the SMS memory is full. During 404, in accordance with receiving the error message from the 4G UE device 104, the MME 118 starts the MME-MCEF timer discussed above. The remaining steps are unchanged with respect to the MME 118 actions in response to the full storage notification by the 4G UE device 104. Such known steps include the HSS 116 registering the full memory status of the 4G UE device 104 at 408.

Figure 5:
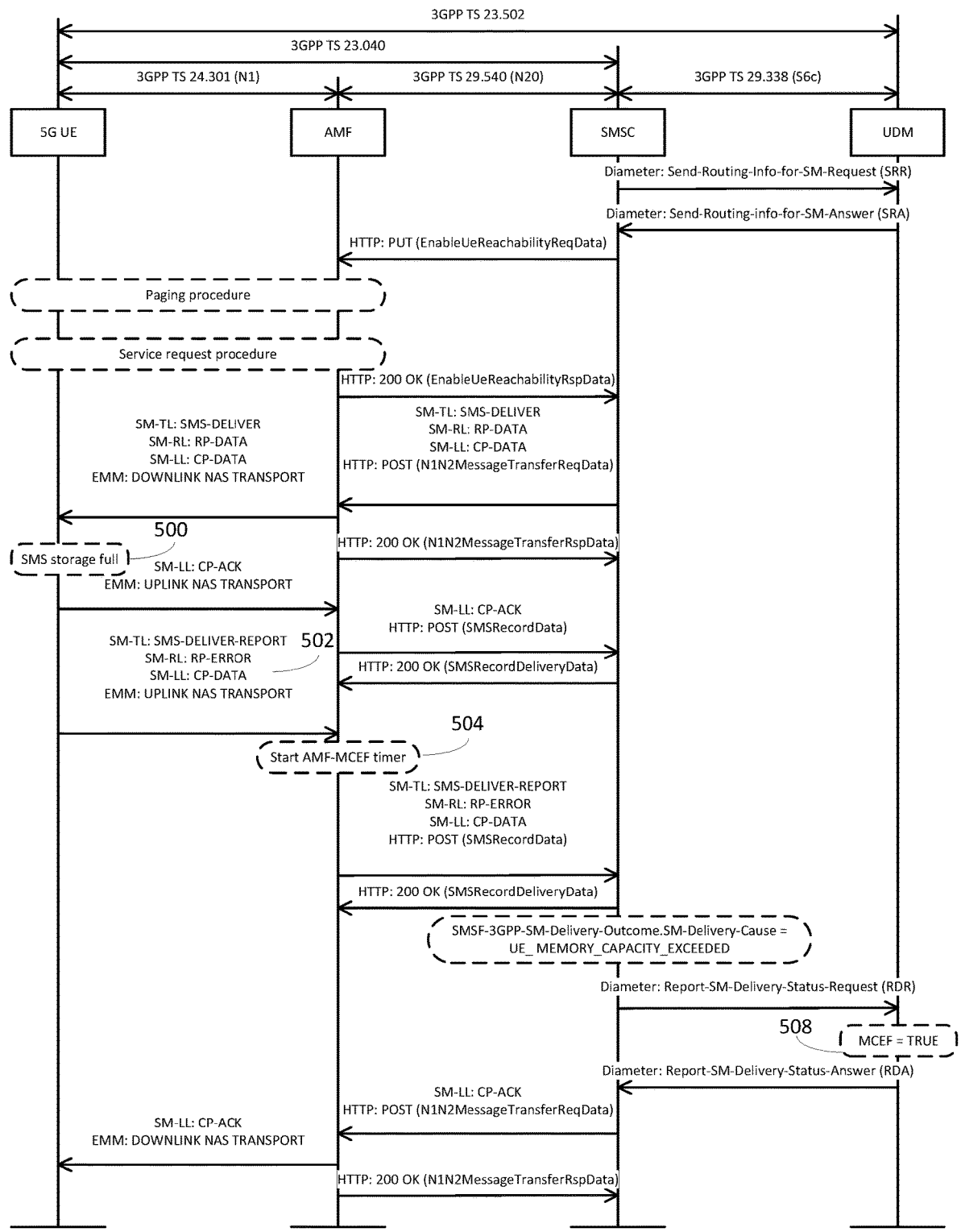
FIG. 5 is a sequence diagram summarizing messages comprising a part of the modifications to the 5G AMF in accordance with the current disclosure.

Turning to FIG. 5 a similar handling of a full SMS storage message received by the AMF 122 from the 5G UE device 106. In accordance with the current disclosure, at 500 the 5G UE device 106 experiences a full storage event. In response, at 502 the 5G UE device 106 issues, via the N1 transport layer signaling, an error message to the AMF 122 indicating that the SMS memory is full. During 504, in accordance with receiving the error message from the 5G UE device 106, the AMF 122 starts the AMF-MCEF timer discussed above. The remaining steps are unchanged with respect to the AMF 122 actions in response to the full storage notification by the UE device 106. Such known steps include the UDM 120 registering the full memory status of the 5G UE device 106 at 508.

Figure 6:
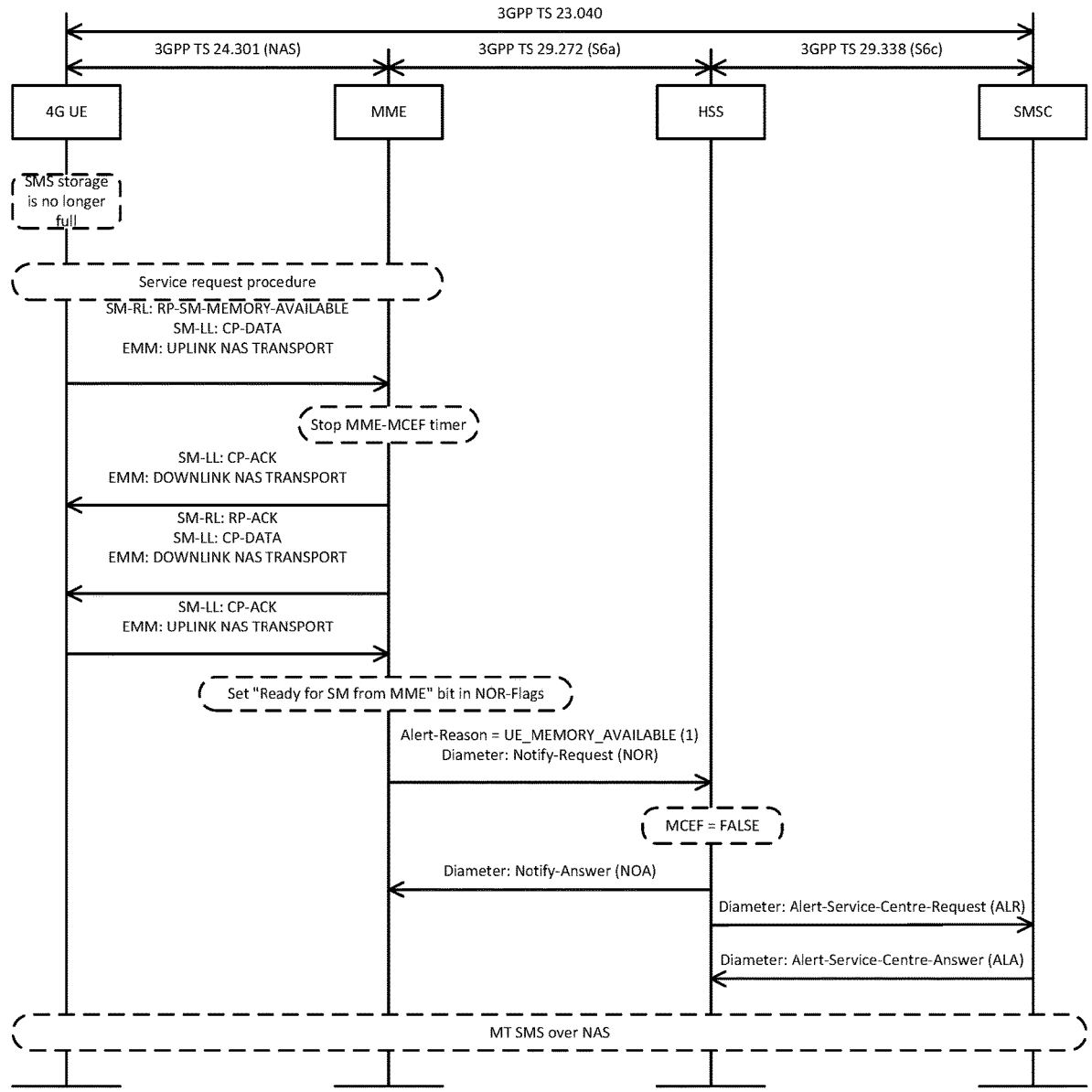
FIG. 6 is a sequence diagram summarizing messages comprising operation of the MME in accordance with a situation where a user equipment is capable of issuing a memory available message in a 4G messaging environment in accordance with the disclosure.
Figure 7:
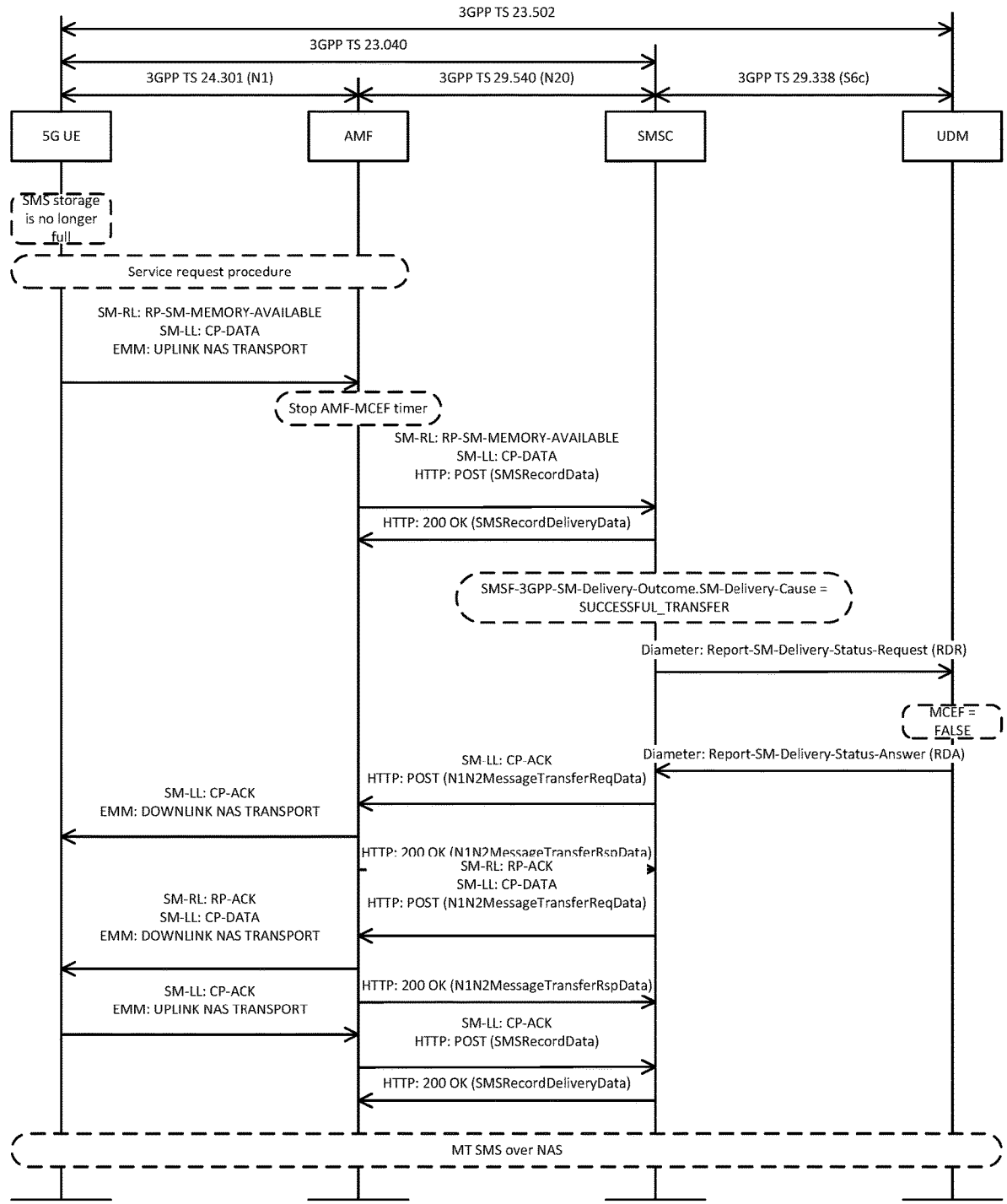
FIG. 7 is a sequence diagram summarizing messages comprising operation of the AMF in accordance with a situation where a user equipment is capable of issuing a memory available message in a 5G messaging environment in accordance with the disclosure.

Briefly referring to FIGS. 6 and 7, sequence diagrams are shown for an arrangement, not applicable to the current disclosed enhancement to mobility management components to act on behalf of user equipment devices that are incapable of indicating when memory is again available for storing SMS messages from a sender. It is contemplated that the modifications to the MME 118 and the AMF 122 described herein will also be present for UE devices that are capable of issuing a memory available message. In such instances, referring to FIG. 6, the MME 118 will stop/clear the MME-MCEF timer and issue message to the HSS 116 indicating that memory is again available in the UE device for storing SMS messages. Similarly, with reference to FIG. 7, the AMF 122 will stop/clear the AMF-MCEF timer in accordance to signaling from the 5G UE device indicating that SMS memory space is again available. Other than the existence of the timer stop/clear operation, the steps recited in FIGS. 6 and 7 are in accordance with a known handling of SMS memory available signaling issued by a user equipment device.

Figure 8:
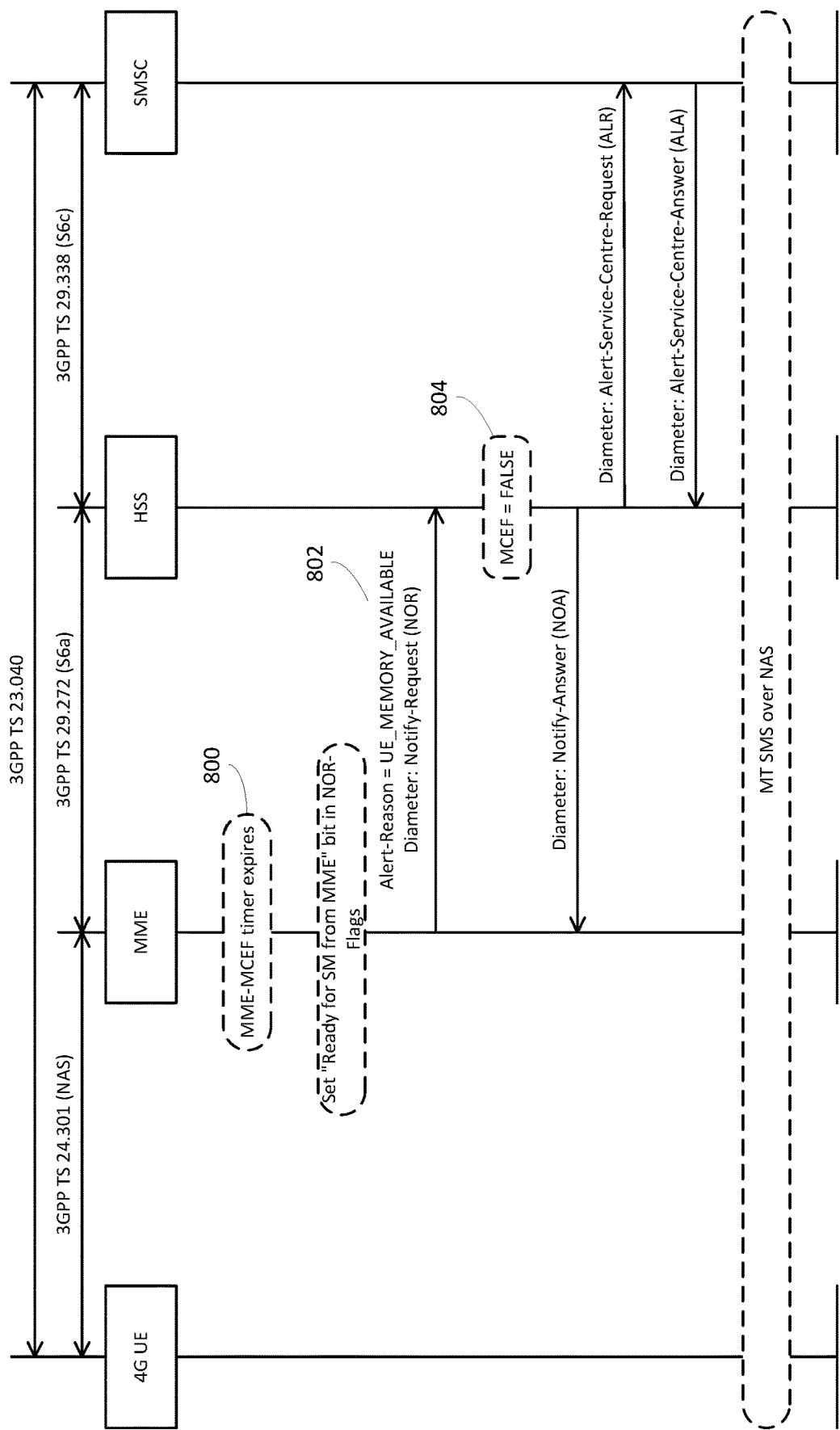
FIG. 8 is a sequence diagram summarizing messages comprising another part of the modifications to the 4G MME in accordance with the current disclosure.
Figure 9:
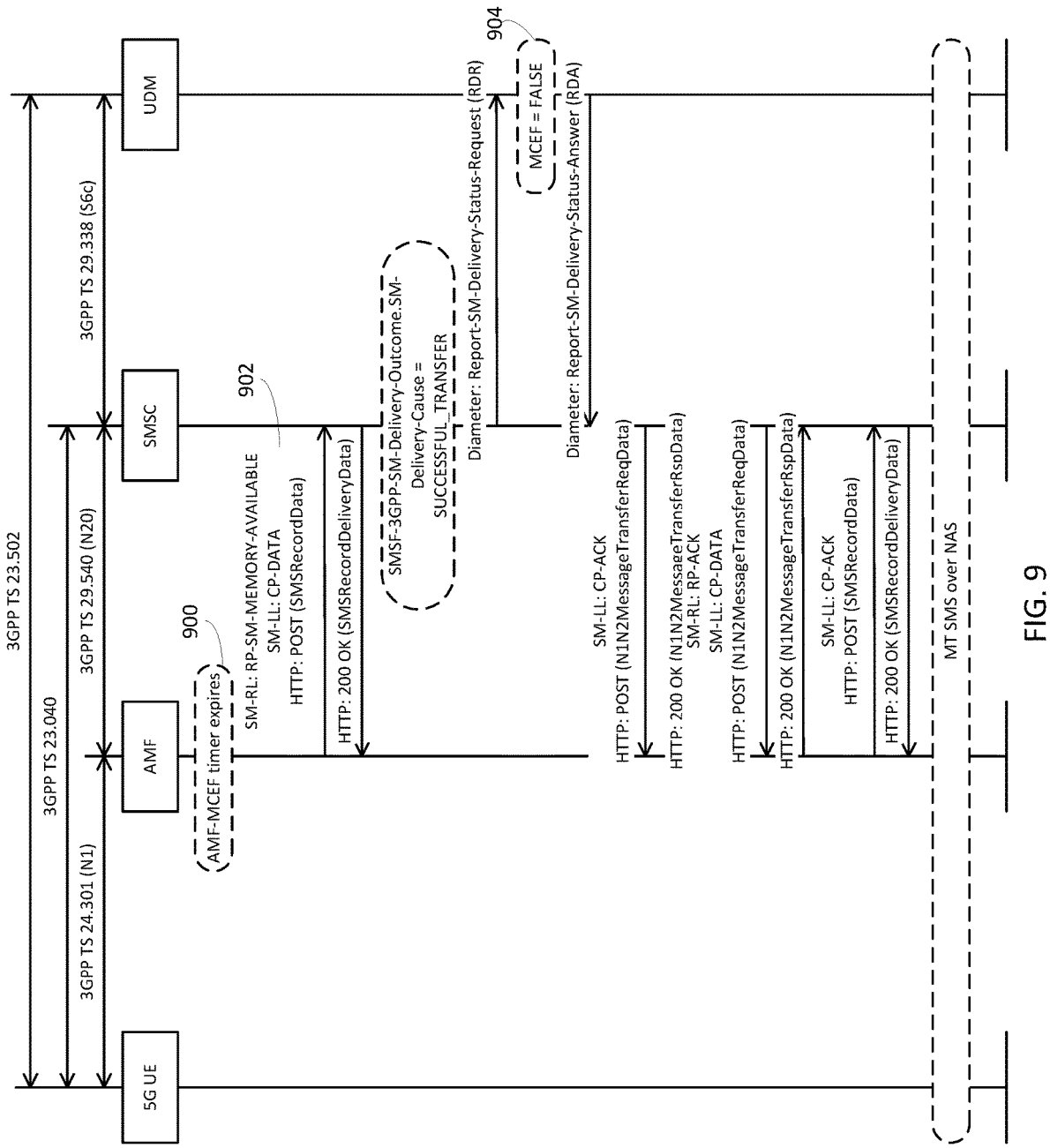
FIG. 9 is a sequence diagram summarizing messages comprising another part of the modifications to the 5G AMF in accordance with the current disclosure.

Turning now to FIGS. 8 and 9, sequence diagrams are providing in accordance with the aforementioned enhancement to operation of mobility management components (e.g., the MME 118 and the AMF 122) in accordance with the disclosure. In particular, with reference to FIG. 8 directed to operation of the MME 118 in a 4G environment, at 800 the MME-MCEF timer expires and no "memory available" message has been received from the 4G UE device 104. In response to the timer expiration event, during 802 the MME 118 issues a message to the HSS 116 indicating that memory is available in the 4G UE device 104 for storing SMS messages (though the MME 118 has not received such indication from the 4G device 104). In response, the HSS 116 will reset the MCEF (indicating memory failure) to false that will enable transmission of SMS messages from the SMSC 108 to the 4G UE device 104 via the MME 118.

Turning to FIG. 9, similar functions are carried out in a 5G messaging environment by the AMF 122. At 900 the AMF-MCEF timer expires and no "memory available" message has been received from the 5G UE device 106. In response to the timer expiration event, during 902 the AMF 122 issues a message (indirectly via the SMSF 114 of the SMSC 108) to the UDM 120 indicating that memory is available in the 5G UE device 106 for storing SMS messages (though the AMF 122 has not received such indication from the 5G device 106). In response, the UDM 120 will reset the MCEF (indicating memory failure) to false that will enable transmission of SMS messages from the SMSC 108 to the 5G UE device 106 via the AMF 122.

Having described an exemplary system for implementing an enhanced SMS memory management by a mobility management component (e.g. MME 118 and AMF 122), a number of implementation details are described herein below. As noted herein above, the MME 118 and AMF 122 implement a new timer (e.g., MME-MCEF and AMF-MCEF, respectively). During set up of the UE device subscription with the MME 118 or AMF 122, the MCEF timer is set up and maintained in a bearer context information storage. Moreover, the MME 118 and AMF 122 implement a configuration parameter for enabling or disabling usage of the MCEF timer by a subscriber. Additionally, machine learning platforms can be used to automatically enable or disable the usage of an MCEF timer for a particular subscriber based on historical interactions between subscribers and the MME 118 and the AMF 122 and the rest of the core network.

As previously noted, the MCEF timer is started when the mobility management component receives a message from a UE device indicating that SMS memory capacity was exceeded. This is, for example, an RP-ERROR message (see 3GPP TS 23.040 and 24.011) which contains an RP-Cause information element set to value 22 indicating memory capacity was exceeded.

When the MCEF timer expires, mobility management component performs a notification procedure towards an HSS (4G) or UDM (5G) as per 3GPP TS 29.272 (4G) or 3GPP TS 29.518 (5G).

Moreover, the MME/AMF (management component) stops the MCEF timer when the mobility management component receives RP-SMMA from 4G/5G UE device.

Additionally, a new enumeration value is defined for the AmfEventType in 3GPP TS 29.518, section 6.2.6.3.3, Table 6.2.6.3.3-1. The new value is "SM_MEMORY_CAPACITY_AVAILABLE". This event type is used by the AMF 122 to inform an NF service consumer about UE readiness to receive SMS messages.

Lastly, in another way in which the aforementioned absence of a UE device "memory available" message signaling, the SMSC can be configured to ignore MCEF statuses issued by the HSS and UDR when deciding whether to deliver an MT SMS to a UE. This configuration can be applied to an individual subscriber, a range of subscribers, or all subscribers that maintain state on the SMSC.

All references, including publications, patent applications, and patents, cited herein are hereby incorporated by reference to the same extent as if each reference was individually and specifically indicated to be incorporated by reference and were set forth in its entirety herein.

The use of the terms "a" and "an" and "the" and similar referents in the context of describing the invention (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

What is claimed is:

1. A method carried out by a mobility management component for providing enhanced short message service (SMS) memory handling in the absence of a user equipment signaling capability to indicate that an SMS memory is available after the user equipment issues a signal indicating an SMS memory unavailable error condition to the mobility management component, the method comprising:
    receiving the signal indicating an SMS memory unavailable error condition from the user equipment device;
    setting, in accordance with the receiving, an SMS memory error condition timer for the user equipment device;
    issuing, in accordance with the receiving, an SMS memory failure message to temporarily cause suspension of sending SMS messages, via a short message service center (SMSC), to the user equipment device; and
    issuing, in response to expiration of a time period after the setting the SMS memory error condition timer, an SMS memory available message to resume SMS message delivery to the mobility management component for forwarding to the user equipment device.

2. The method of claim 1, wherein the mobility management component is a mobility management entity (MME) operating in a 4G mobile wireless operating environment.

3. The method of claim 1, wherein the mobility management component is an access and mobility management function (AMF) operating in a 5G mobile wireless operating environment.

4. The method of claim 1, wherein the time period is on the order of a minute.

5. The method of claim 1, wherein the time period is about 30 seconds.

6. A mobility management component configured to perform a method for providing enhanced short message service (SMS) memory handling in the absence of a user equipment signaling capability to indicate that an SMS memory is available after the user equipment issues a signal indicating an SMS memory unavailable error condition to the mobility management component, wherein the mobility management component comprises:
    a processor; and
    a non-transitory computer-readable medium comprising computer-executable instructions that, when executed by the processor, facilitate carrying out the method comprising:
    receiving the signal indicating an SMS memory unavailable error condition from the user equipment device;
    setting, in accordance with the receiving, an SMS memory error condition timer for the user equipment device;
    issuing, in accordance with the receiving, an SMS memory failure message to temporarily cause suspension of sending SMS messages, via a short message service center (SMSC), to the user equipment device; and
    issuing, in response to expiration of a time period after the setting the SMS memory error condition timer, an SMS memory available message to resume SMS message delivery to the mobility management component for forwarding to the user equipment device.

7. The mobility management component of claim 6, wherein the mobility management component is a mobility management entity (MME) operating in a 4G mobile wireless operating environment.

8. The mobility management component of claim 6, wherein the mobility management component is an access and mobility management function (AMF) operating in a 5G mobile wireless operating environment.

9. The mobility management component of claim 6, wherein the time period is on the order of a minute.

10. The mobility management component of claim 6, wherein the time period is about 30 seconds.

* * * * *